United States Patent
Raaf et al.

(10) Patent No.: US 9,350,427 B2
(45) Date of Patent: May 24, 2016

(54) METHOD AND APPARATUS FOR TRANSMITTING PHYSICAL SIGNALS

(75) Inventors: Bernhard Raaf, Neuried (DE); Hai Ming Wang, Beijing (CN); Erlin Zeng, Beijing (CN); Gilles Charbit, Hampshire (GB); Jing Han, Beijing (CN)

(73) Assignee: CELLULAR COMMUNICATIONS EQUIPMENT LLC, Plano, TX (US)

( * ) Notice: Subject to any disclaimer, the term of this patent is extended or adjusted under 35 U.S.C. 154(b) by 90 days.

(21) Appl. No.: 13/502,236

(22) PCT Filed: Oct. 16, 2009

(86) PCT No.: PCT/CN2009/074493
§ 371 (c)(1),
(2), (4) Date: May 18, 2012

(87) PCT Pub. No.: WO2011/044734
PCT Pub. Date: Apr. 21, 2011

(65) Prior Publication Data
US 2012/0236798 A1    Sep. 20, 2012

(30) Foreign Application Priority Data
Oct. 16, 2009  (of) .................. PCT/CNO9/74493

(51) Int. Cl.
*H04B 7/04* (2006.01)
*H04W 52/32* (2009.01)
*H04L 5/00* (2006.01)

(52) U.S. Cl.
CPC ............ *H04B 7/0452* (2013.01); *H04L 5/0048* (2013.01); *H04L 5/0053* (2013.01); *H04W 52/325* (2013.01)

(58) Field of Classification Search
CPC .. H04L 5/0048; H04L 5/0053; H04B 7/0452; H04B 7/15557; H04W 72/04; H04W 52/325
USPC .................................................. 370/328, 329
See application file for complete search history.

(56) References Cited

U.S. PATENT DOCUMENTS

2008/0232494 A1*  9/2008  Pan et al. ................ 375/260
2008/0311919 A1   12/2008  Whinnett et al. ............. 455/447

(Continued)

FOREIGN PATENT DOCUMENTS

CN        101034931 A        9/2007
CN        101150571 A        3/2008

(Continued)

OTHER PUBLICATIONS

3GPP TS 36.211 V8.4.0 (Sep. 2008), "3rd Generation Partnership Project Technical Specification Group Radio Access Network; Evolved Universal Terrestrial Radio Access (E-UTRA); Physical Channels and Modulation (Release 8)", 80 pgs.

(Continued)

*Primary Examiner* — Un C Cho
*Assistant Examiner* — Fangyan Deng
(74) *Attorney, Agent, or Firm* — Procopio, Cory, Hargreaves & Savitch, LLP

(57) ABSTRACT

Transmitting physical signals precoded at the physical layer, and transmitting via a physical channel precoded at the physical layer decoding information for use in physical layer decoding of said physical signals; wherein said decoding information is incorporated into one or more data units at a layer higher than the physical layer. Transmitting in a single sub-frame one or more physical reference signals for use in physical layer decoding of a physical channel in a plurality of sub-frames.

19 Claims, 8 Drawing Sheets

(56) References Cited

U.S. PATENT DOCUMENTS

| | | | | |
|---|---|---|---|---|
| 2010/0080139 | A1* | 4/2010 | Palanki et al. | 370/252 |
| 2010/0195566 | A1* | 8/2010 | Krishnamurthy et al. | 370/328 |
| 2010/0296473 | A1* | 11/2010 | Kim et al. | 370/329 |
| 2011/0299489 | A1* | 12/2011 | Kim et al. | 370/329 |
| 2012/0114021 | A1* | 5/2012 | Chung et al. | 375/211 |

FOREIGN PATENT DOCUMENTS

| | | |
|---|---|---|
| CN | 101174873 A | 5/2008 |
| CN | 101330486 A | 12/2008 |
| CN | 101394251 A | 3/2009 |
| CN | 201307860 Y | 9/2009 |
| EP | 1 322 121 A2 | 6/2003 |
| WO | WO 2008/084693 A1 | 7/2008 |

OTHER PUBLICATIONS

R1-092138; 3GPP TSG RAN WG1 Meeting #57; LG Electronics; "Consideration on MU-MIMO for LTE-Advanced"; San Francisco, USA; May, 4-8, 2009, (3 pages).

3GPP TSG RAN WG1 Meeting #53; R1-081848; Nokia, Nokia Siemens Networks; "Signaling of precoding information"; Kansas City, MO, USA, May 5-9, 2008 (3 pages).

3GPP TSG-RAN WG1 #52bis; R1-081682; Ericsson, Texas Instruments, NTT DoCoMo, Sharp, NEC, Mitsubishi; "Refinements on Signalling of CQI/Precoding Information on PDCCH"; Shenzhen, China, Mar. 31-Apr. 4, 2008 (4 pages).

3GPP TSG RAN WG1 meeting #50bis; R1-074227; Huawei; "MIMO precoding information in PDCCH"; Shanghai, China, Oct. 8-12, 2007 (3 pages).

3GPP TSG-RAN WG1 #56; R1-090874; Qualcomm Europe; "Views for DL MIMO operation in LTE-A"; Feb. 9-13, 2009, Athens, Greece (7 pages).

3GPP TSG RAN1 #57; R1-091710; ZTE; "Cooperation Scheme Considerations for Type II Relay"; San Francisco, US, May 4-8, 2009 (4 pages).

3GPP TSG RAN WG1 #58; R1-093375; Samsung; „Discussions on CSI-RS for LTE-Advanced; Shenzhen, China, Aug. 24-28, 2009 (5 pages).

* cited by examiner

Figure 5

METHOD AND APPARATUS FOR TRANSMITTING PHYSICAL SIGNALS

TECHNICAL FIELD

The present invention relates to physical signals for use in decoding physical channels. In one embodiment, it relates to physical signals transmitted from a base station (eNB) to a relay node (RN) for use by the relay node in the physical layer decoding of physical channels from the base station.

BACKGROUND

Relaying is a proposed technology for 3GPP LTE-Advanced networks. Base stations (eNB) operate in an enhanced UTRAN (E-UTRAN) cellular network; and relay nodes (RN) are deployed to extend coverage in the cellular network and to also help in the provisioning of high data rate coverage in high shadowing environments (e.g. inside buildings) and high-traffic hotspots. An example of how an eNB of a LTE radio access network is deployed with fixed relay nodes is shown in FIG. 1. Tasks of the RN include: forwarding data between the eNB and a communication device, and also optionally to support communications from the communication device to the eNB.

SUMMARY

In order to increase the rate at which data can be transmitted from the eNB to the relay node, it is proposed to use physical layer precoding for the physical shared channel (PDSCH) transmissions from the eNB to the RN. Decoding of the precoded PDSCH transmissions at the RN generally requires the use of information from the eNB. One proposal is to use physical common reference signals transmitted by the eNB on respective resource elements within a physical resource block, and additional precoding information transmitted on a non-precoded control channel (PDCCH).

However, depending, for example, on the number of antenna ports used for MIMO transmissions at the eNB transmitter, it may be necessary to regularly send a relatively high number of reference signals to a RN. It is aim of the present invention to provide a new technique for transmitting information for use in the physical layer decoding of precoded physical channel transmissions.

According to the present invention, there is provided a method comprising: transmitting physical signals precoded at the physical layer, and transmitting via a physical channel precoded at the physical layer decoding information for use in physical layer decoding of said physical signals; wherein said decoding information is incorporated into one or more data units at a layer higher than the physical layer.

The present invention also provides a method comprising: transmitting in a single sub-frame one or more physical reference signals for use in physical layer decoding of a physical channel in a plurality of sub-frames. One embodiment includes sending an indication of the identity of the sub-frame in which said one or more physical reference signals can be found.

The present invention also provides a method comprising receiving physical signals precoded at the physical layer; using decoding information received via a physical channel precoded at the physical layer to decode said reference signals at the physical layer; wherein said decoding information is extracted from one or more data units at a layer higher than the physical layer.

The present invention also provides a method comprising: using one or more physical reference signals located in a single sub-frame to carry out physical layer decoding of a physical channel in a plurality of sub-frames. One embodiment includes receiving an indication of the identity of the sub-frame in which said one or more physical reference signals are located.

In one embodiment, the decoding information includes information for physical layer decoding of a multi-antenna transmission.

In one embodiment, said layer higher than the physical layer is a radio resource control layer.

In one embodiment, the physical channel includes data for relaying to a user equipment via a wireless interface.

The present invention also provides apparatus configured to carry out any of the above methods.

The present invention also provides apparatus comprising a processor and memory including computer program code, wherein the memory and the computer program are configured to, with the processor, cause the apparatus at least to perform any of the above methods.

The present invention also provides a computer program product comprising program code means which when loaded into a computer controls the computer to perform any of the above methods.

The present invention also provides a system comprising: a transmitter configured to transmit physical signals precoded at the physical layer, and transmit via a physical channel precoded at the physical layer decoding information for use in physical layer decoding of said physical signals, wherein said decoding information is incorporated into one or more data units at a layer higher than the physical layer; and a receiver configured to receive said physical signals precoded at the physical layer, and use said decoding information to decode said reference signals at the physical layer.

The present invention also provides a system comprising: a transmitter configured to transmit in a single sub-frame one or more physical reference signals for use in physical layer decoding of a physical channel in a plurality of sub-frames; and a receiver configured to use said one or more physical reference signals located in a single sub-frame to carry out physical layer decoding of a physical channel in a plurality of sub-frames.

BRIEF DESCRIPTION OF THE DRAWINGS

Hereunder an embodiment of the present invention will be described, by way of example only, with reference to the following drawings, in which:

FIG. 5 illustrates an example of a physical resource block used in an embodiment of the present invention;

DETAILED DESCRIPTION

Figure 1:
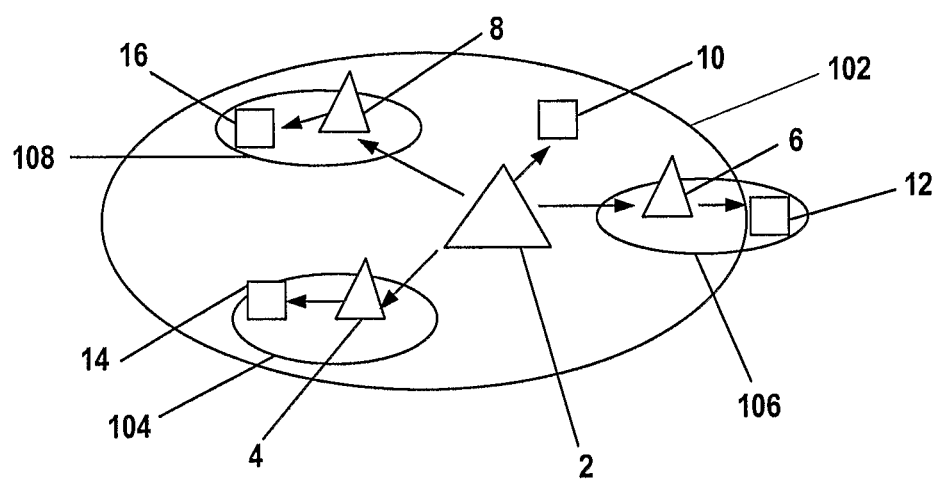
FIG. 1 illustrates an example of the deployment of relay nodes (RN) in a cell of an access network served by a base station (eNodeB)

FIG. 1 illustrates one cell of a E-UTRAN network deployed with relay nodes. A base station (DeNB) 2 with a first coverage area 102 communicates directly with one or more user equipments 10, and indirectly with other user equipments 12, 14 and 16 via respective relay nodes. Each of the relay nodes has a respective coverage area which may lie wholly within the coverage area of the DeNB 2 or may extend partly out of the coverage area of the DeNB 2. The former kind of relay nodes 4, 8 can be useful in overcoming excessive shadowing, or facilitating an increase in throughput in areas of high traffic (hotspots). The latter kind of relay node 6 can be additionally useful for extending the effective coverage of the eNB 2.

Figure 2:
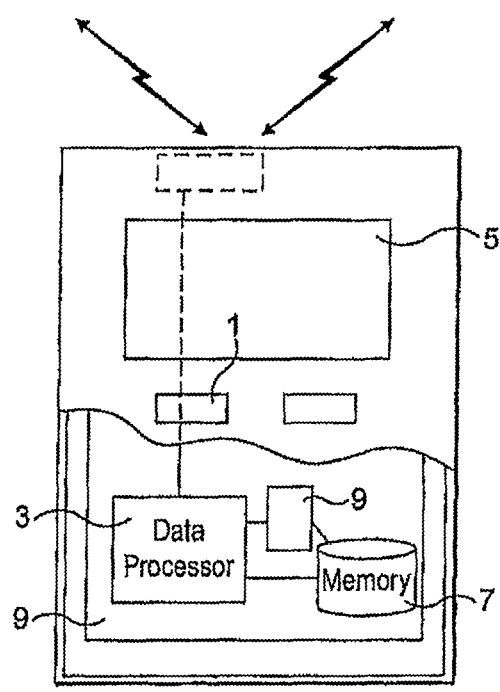
FIG. 2 illustrates a user equipment shown in FIG. 1 in further detail.

FIG. 2 shows a schematic partially sectioned view of an example of user equipment that may be used for at least receiving data directly or indirectly from the DeNB 2 via one or more wireless interfaces. The user equipment may be used for various tasks such as making and receiving phone calls, for receiving and sending data from and to a data network and for experiencing, for example, multimedia or other content.

The user equipment may be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The user equipment may communicate via an appropriate radio interface arrangement of the user equipment. The interface arrangement may be provided for example by means of a radio part 7 and associated antenna arrangement. The antenna arrangement may be arranged internally or externally to the user equipment.

The user equipment may be provided with at least one data processing entity 3 and at least one memory or data storage entity 7 for use in tasks it is designed to perform. The data processor 3 and memory 7 may be provided on an appropriate circuit board 9 and/or in chipsets.

The user may control the operation of the user equipment by means of a suitable user interface such as key pad 1, voice commands, touch sensitive screen or pad, combinations thereof or the like. A display 5, a speaker and a microphone may also be provided. Furthermore, the user equipment may comprise appropriate connectors (either wired or wireless) to other devices and/or for connecting external accessories, for example hands-free equipment, thereto.

Figure 3:
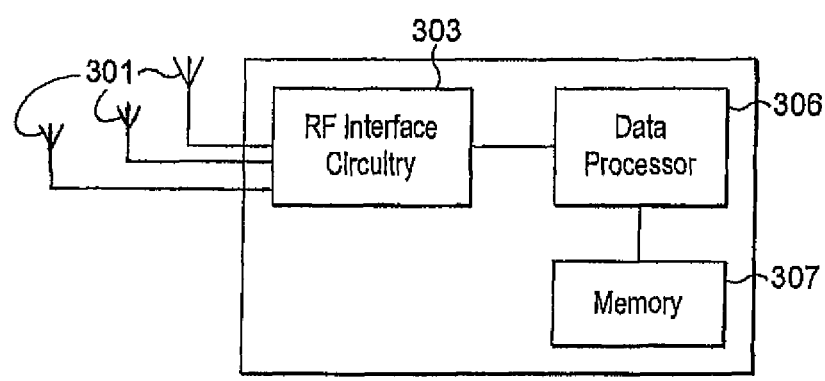
FIG. 3 illustrates an apparatus suitable for implementing an embodiment of the invention at a relay node or eNodeB of the system shown in FIG. 1.

FIG. 3 shows an example of an apparatus for use at the relay nodes 4, 6, 8 and the DeNB 2. The apparatus comprises a plurality of radio frequency antennae 301 configured to receive and transmit radio frequency signals, radio frequency interface circuitry 303 configured to interface the radio frequency signals received and transmitted by the antennae 301 and the data processor 306. The radio frequency interface circuitry may also be known as a transceiver. The apparatus may also comprise a data processor configured to process signals from the radio frequency interface circuitry 303, control the radio frequency interface circuitry 303 to generate suitable RF signals to communicate information to a relay node or a user equipment via a wireless communications link. The apparatus further comprises a memory 307 for storing data, parameters and instructions for use by the data processor 306.

It would be appreciated that both the user equipment and relay node/eNB apparatus shown in FIGS. 2 and 3 respectively and described above may comprise further elements which are not directly involved with the embodiments of the invention described hereafter.

Although the following describes an embodiment of the invention using evolved node B (eNB) apparatus and relay nodes operating within an LTE access network (E-UTRAN), further embodiments of the invention may be performed in any transmitters/receivers comprising data processing and storage capacity suitable for carrying the operations as described below.

Figure 5:
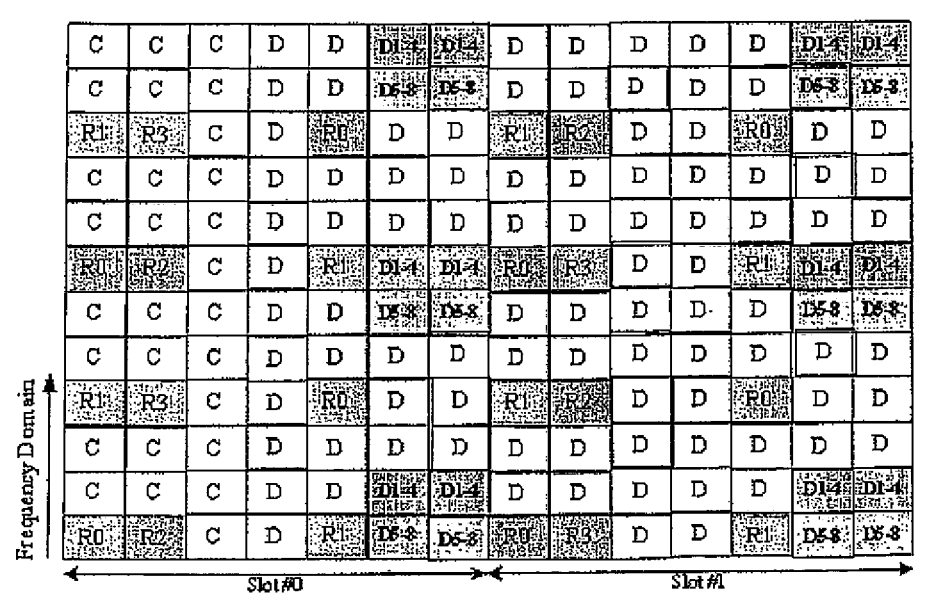

Compatibility with LTE Standard Release 8 is achieved by the use of MBSFN (Multimedia Broadcast over Single-Frequency Network) in the RN cell. An example of a physical resource block (PRB) based on a MBSFN sub-frame is illustrated in FIG. 5. A 10 ms radio frame is divided into 20 equally sized slots of 0.5 ms. A sub-frame consists of two consecutive slots (numbered #0 and #1 in FIG. 5); thus, one radio frame contains 10 sub-frames. The transmitted signal in each slot is described by a resource grid of N orthogonal sub-carriers in the frequency domain and N OFDM symbols in the time domain. In the example illustrated in FIG. 5, each slot is made up of 7 OFDM (orthogonal frequency division multiplexing) symbols, and the physical resource block comprises 12 orthogonal subcarriers in the frequency domain.

In the MBSFN sub-frame illustrated in FIG. 5, the first three symbols for each orthogonal subcarrier in the PRB are reserved for its own transmissions (e.g. transmission of PDCCH control symbols and common reference signals (CRS) from the relay node to a user equipment) and switching from transmission to reception of DL backhaul transmission from the DeNB. The remaining eleven symbols for each orthogonal subcarrier in the PRB are used for transmissions from the DeNB to the relay node.

At least two types of physical reference signals (RS) are included in the PRB. A physical signal does not carry information originating from any layer higher than the physical layer. FIG. 5 shows an example of a pattern for interspersing these physical signals amongst resource elements allocated to physical channels.

In the example, reference signals dedicated to a single RN (dedicated reference signals—DRS) are labeled D1-4 and D5-8. Code division multiplexing is used to transmit a plurality of dedicated reference signals in the same frequency-time resource element. A single resource element can thus be used to transmit up to 4 different reference signals for respective eNB antenna ports. As shown in FIG. 5, the dedicated reference signals are repeated in a plurality of resource elements within the same PRB. Cell specific reference signals (CRS) intended for common use by any RN serving the eNB are also included in the PRB, and are labeled as R0-R3 elements in FIG. 5.

The example shown in FIG. 5 shows the remaining part of the PRB exclusively allocated to physical data channel (R-PDSCH) transmissions from the DeNB 2. However, other examples include: (a) including in the same PRB both physical control channel (R-PDCCH) and physical data channel (R-PDSCH) for a single RN; and (b) including in the same PRB both R-PDCCH for a first RN and R-PDSCH for a second RN. Also, the DeNB 2 can transmit independent control/data channels to a plurality of RNs in a single PRB using spatial division multiplexing (SDM), in which signals to different RNs in the same frequency-time resource element are separated by means of precoding using more than one antenna at the DeNB 2.

In each of these examples, for at least some of the time when the RN in an active mode, both the dedicated reference signals (DRS) for that RN and the physical channels (PDCCH and PDSCH) for that RN are precoded at the physical layer. The same precoding is applied to both DRS and the physical channels for that RN. The performance can be thus improved due to better signal quality and better channel estimation quality. Where precoding is additionally used to transmit independent physical channels to more than one RN in a single resource element, there is also an improvement in thoughput as a result of more effective frequency-time resource use.

The precoded physical channels (R-PDCCH and R-PDSCH) transmitted by eNB to a RN are detected based on the precoded dedicated reference signals (DRS) for that RN. The DeNB 2 uses the same precoding for R-PDCCH, R-PDSCH and the DRS within the resources allocated to that RN. For at least some of the time that an RN is in an active mode, the precoding information necessary to decode the precoded channels and DRS is indicated by DeNB 2 to the RN semi-statically via higher layer signaling.

The precoding information provided from the DeNB 2 to the RN via higher layer signaling indicates which antenna ports (Rank) are used by the DeNB 2 to transmit the DRS, and the RN uses this information and the DRS to estimate the equivalent channel matrix, which channel matrix is used to detect the R-PDCCH and R-PDSCH for that RN.

For the cases where multiple RNs are served in the same set of, frequency-time resources by use of spatial division multiplexing (SDM), signaling the precoding information via higher layer signaling to each RN can ensure effective interference cancelling in receiver processing.

One technique for increasing the resources for R-PDCCH and R-PDSCH comprises including in a single PRB only DRS for a single RN served by the DeNB 2, and providing DRS for a plurality of RNs by transmitting DRS for any single RN in only a subset of all DL backhaul subframes. The subset of subframes containing DRS for a RN may be indicated to the RN by means of higher layer signaling or defined by some rules known by both the RN and the DeNB 2. This technique makes it possible for DeNB 2 to reduce the DRS overhead for the DeNB-RN link and thereby achieve higher efficiency for that link. This technique is particularly useful where the link between the DeNB 2 and the RN is relatively stable, such as when the RN is in a fixed location.

The DeNB 2 antenna ports mapped to the above-mentioned DRS allow multiplexing of up to 8 RNs in a PRB. In case it is needed to further increase the order of multiplexing of RNs within the same PRB, the antenna ports mapped to the non-precoded common reference signals (CRS) labeled as R0 to R3 in FIG. 5 may also be used by RNs for non-precoded R-PDCCH and R-PDSCH transmissions. The extent to which this is possible depends on the rank of the link channel between the DeNB 2 and the RNs and the multi-stream configuration of PDSCHs and the transmission mode of R-PDCCH of RNs. According to one example, the DeNB 2 only transmits uplink (UL) grants in a sub-frame to those RN for which there is no DL data in that subframe. As a result, other RN's R-PDCCH or R-PDSCH will be multiplexed in the same set of PRBs in a TDM fashion.

According to one example, the DeNB 2 precodes data/control channels for those RNs for which DRS are transmitted, and the DeNB 2 does not apply any physical layer precoding to physical data/control channels for those RNs that use the CRS. Each RN checks the higher layer signalling for itself to determine whether to use the DRS or the CRS.

Where the state of the link between the DeNB 2 and a RN is subject to unexpected and sudden variations, such as can be the case when a RN is a mobile node that can alter its location, it is preferable that: (a) RN should detect R-PDCCH based on the non-precoded CRS, and detect R-PDSCH based on the precoded DRS; (b) the DeNB 2 should not apply any precoding on the R-PDCCH for that RN; and (c) the DeNB 2 should apply the same precoding on the DRS and R-PDSCH in that PRB, and indicate the precoding information to the RN via R-PDCCH.

In other words, where the properties of a link between the DeNB 2 and a RN change too fast for the favoured technique of semi-static precoding on R-PDCCH to work well, the DeNB 2 does not apply any precoding on R-PDCCH for that RN (and thus there is no spatial multiplexing of R-PDCCHs for that RN). This alternative technique is also useful for cases where non-precoded R-PDCCH for a first RN #1 is combined in a single PRB with precoded R-PDSCH for a second RN #2 by time division multiplexing.

In these cases, it may be preferable that the precoding information e.g., Precoding Matrix Indicator (PMI)/Rank information for decoding the DRS may be included in non-precoded R-PDCCH so that the RN is able to resume use of DRS when the conditions are favourable for doing so again. This may also be useful in situations where R-PDCCH is not precoded but only R-PDSCH is supported by precoded DRS. By decoding R-PDCCH using the CRS, the RN will know the precoding information for DRS and-R-PDSCH and can detect them accordingly.

Figure 4:
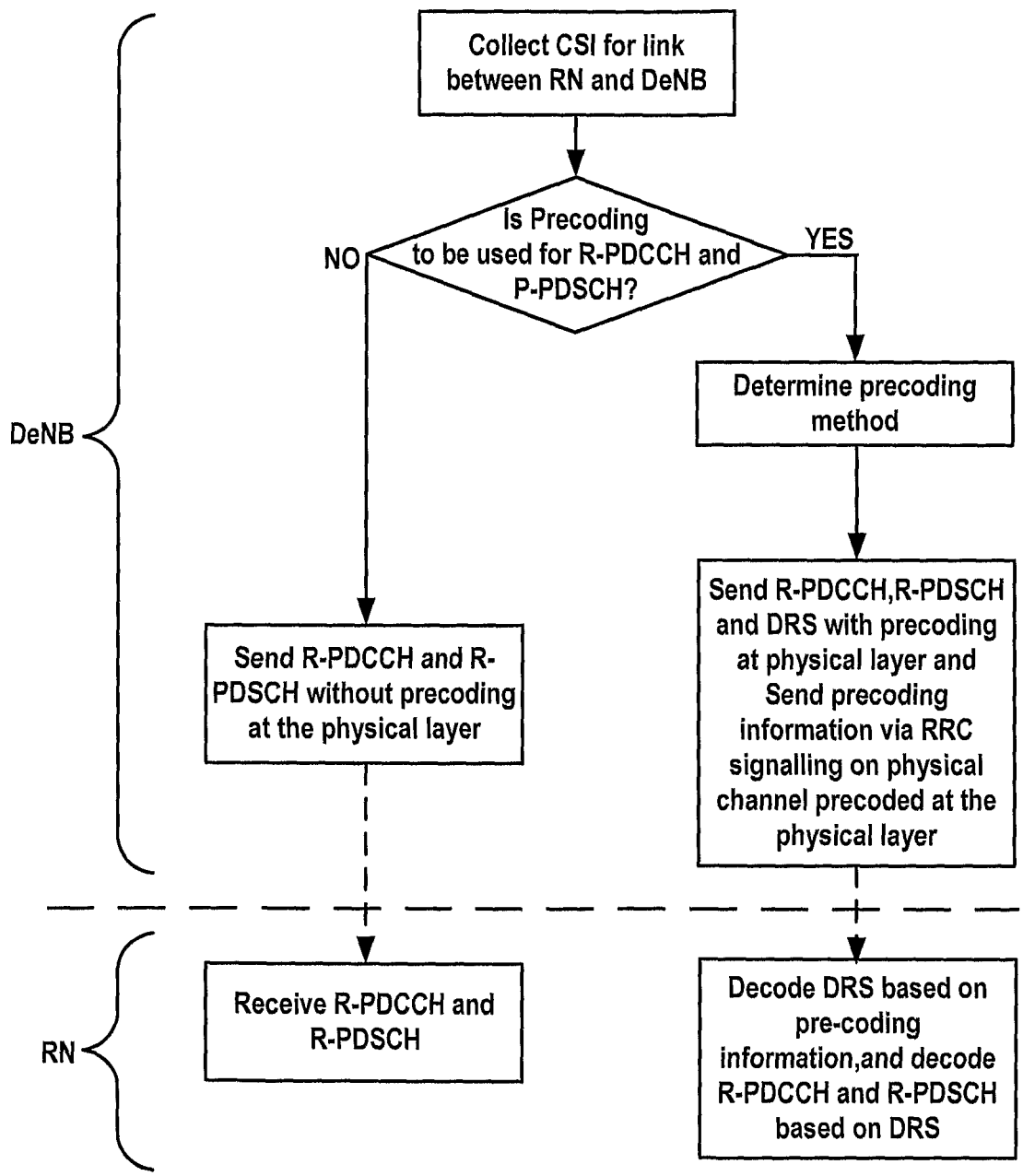
FIG. 4 illustrates an example of the operation of the eNodeB and a relay node of FIG. 1 in accordance with an embodiment of the invention.

An example of the operation of the DeNB 2 and an RN is illustrated in FIG. 4. For each RN served by the DeNB 2, the DeNB 2 first collects channel state information (CSI) on the link between the DeNB 2 and the RN, and then determines whether or not to use precoding on each channel and, if yes, what precoder to use. If the DeNB 2 determines that precoding is to be used, the DeNB 2 then precodes the channel and DRS with the selected precoder, and the DeNB 2 indicates the precoding information to the respective RN via higher layer RRC signaling. These precoded channels, together with the non-precoded CRS, are then mapped to resources which are allocated to the RN.

There are a number of possible ways in which the DeNB 2 can make an estimation of the link between the DeNB 2 and an RN, including the following, which can be used alone or in combination.

1) the RN is configured by DeNB 2 to transmit sounding reference signals (R-SRS) to the DeNB. These R-SRS can be the same kind of reference signals as identified as SRS in the LTE Release 8 standard for transmissions between a user equipment and a eNB. The R-SRS can be located in the last symbol in the sub-frame; the R-SRS can be multiplexed with SRS for UEs in the DeNB 2 cell; and the resources and periodicity used for the R-SRS can be semi-statically configured by the DeNB 2.

Figure 7A:
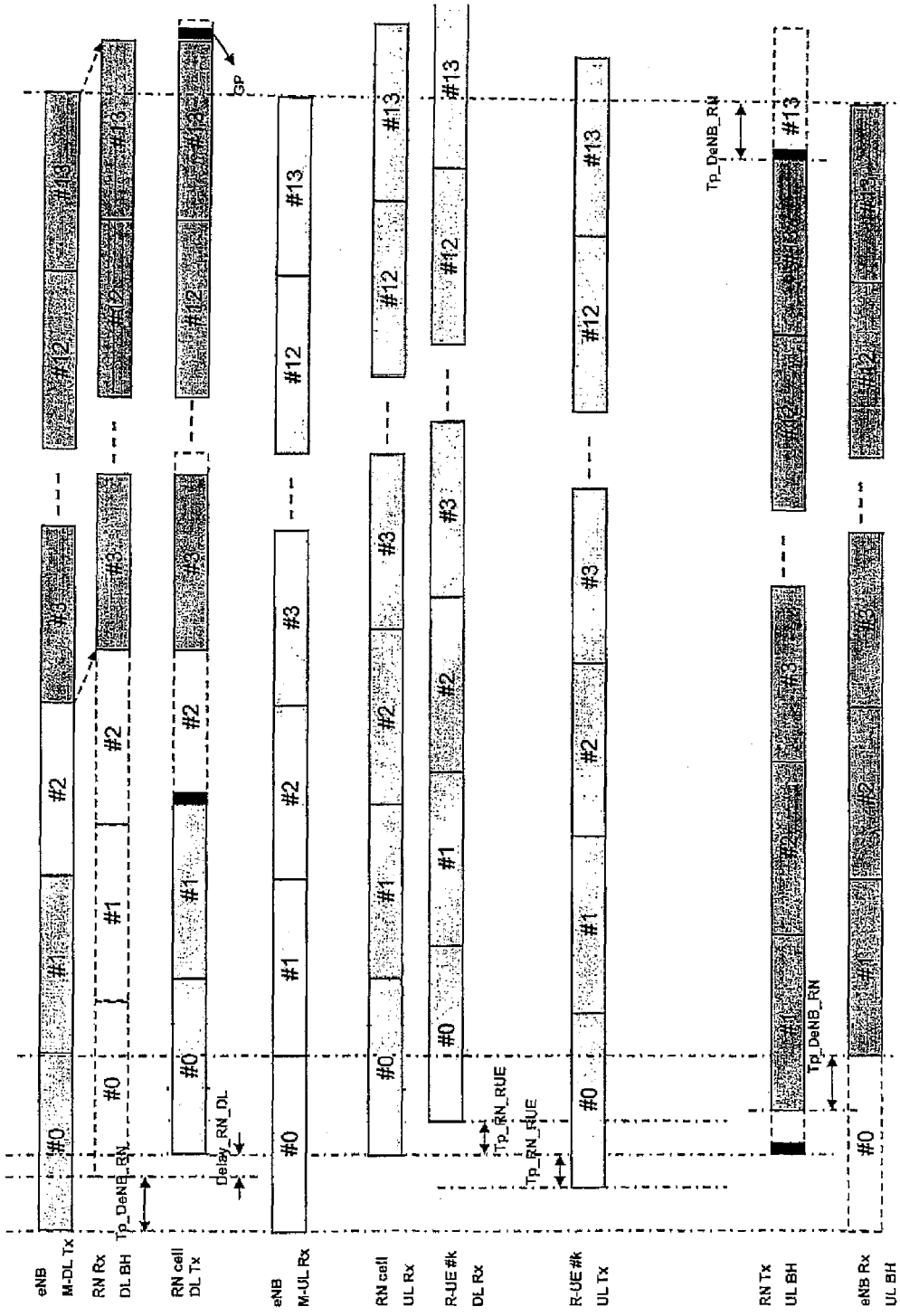
FIGS. 7(a) and 7(b) illustrate examples of tuning UL timing in an RN cell of FIG. 1 for facilitating the transmission of reference signals from a relay node to the eNodeB in FIG. 1.
Figure 7B:
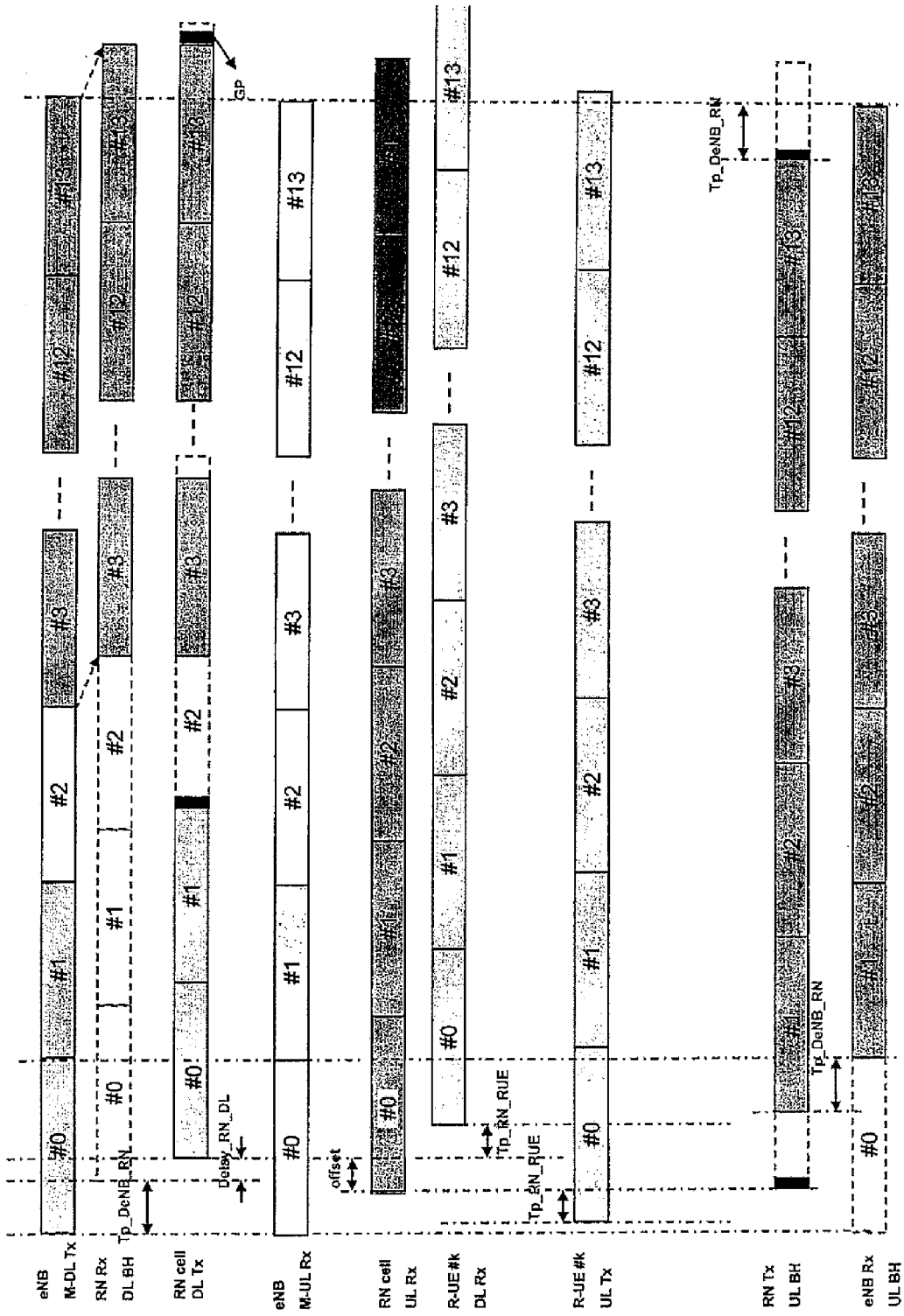

To make the last symbol in UL backhaul subframe available, some tuning of RN cell UL timing may be necessary. Examples of timing configurations are illustrated in FIGS. 7(a) and 7(b), for the respective cases (a) where the RN cell UL timing is aligned with the RN cell DL timing, and (b) where there is an offset between the RN cell UL timing and the RN cell DL timing. The use of R-SRS is particularly useful for RNs for which the distance between the DeNB 2 and the RN is relatively small.

The R-SRS are particularly useful for the DeNB 2 to make the determination on whether not to use precoding for transmissions to the RN (and if so, which precoder to use), for any RN for which the state of the link with the DeNB 2 can be assumed to be essentially the same in both directions (as is the case, for example, in a time division duplex (TDD) system where the same frequency is used for transmissions in both directions).

2) The DeNB 2 sends channel state information reference signals (CSI-RS) such as those proposed for LTE Release 10; and the RN uses these reference signals to measure the state of the channel between the DeNB 2 and the RN, and reports the result of these measurements to the DeNB 2. This technique is considered to be particularly useful where no reciprocity can be assumed for the DeNB-RN link, such as is the case for a frequency division duplex system, where different frequencies are used for transmissions in opposite directions. Where transmissions to the RN are not configured for all DL sub-frames from the DeNB 2, and LTE Release 10 standard CSI-RS for all the eight DeNB 2 antenna ports are not available to the RN in every sub-frame; the DeNB 2 can transmit new CSI-RS and the RNs can be configured to measure and report the CSI periodically.

One antenna port per stream (R-PDCCH or R-PDSCH) is considered to be sufficient to carry out channel state estimation based on coherence bandwidth and coherence time. For example, based on the time/frequency coherence property of the link between the DeNB 2 and the RN, the RN may use time or frequency domain interpolation to arrive at an estimation of the channel state based on a relatively limited number of coherence bandwidth and coherence time. Such interpolation is also effective for the case of the technique mentioned above in which the DRS is transmitted only in a subset of backhaul subframes or allocated PRBs in order to reduce the DRS overhead.

Several precoding methods are possible for transmissions from the DeNB 2 to a RN, and the precoding information sent from the DeNB 2 to the RN is formulated accordingly. Some examples are described below.

Single RN precoding
  Precoding information includes the rank used for precoding. From the rank information, the RN knows which DRS to monitor and use to estimate the channel matrix. For example, the rank used for precoding may go up to 8, i.e., the DeNB 2 may have up to 8 antenna ports. If the link from DeNB 2 to RN is basically a line-of sight (LOS) link, the DeNB 2 will transmit 1 or 2 spatial streams to RN which means RN will only monitor 1 or 2 DRS. The RN may not necessarily need to know the exact PMI, i.e., precoding vector or matrix, for detecting the precoded physical channels since the DRS is also precoded, which means the precoder is part of the DRS as seen by a RN.
Multiple RN SDM
  When transmissions from the DeNB 2 to several RNs are combined in a single PRB by spatial division multiplexing, the precoding information may further indicate the number of co-channel RNs and the PMI used by them. For example, the RN may be able to use such information to estimate the precoding used for other RNs and thereby better take into account interference in the spatial domain when decoding its own channels/reference signals.
Open loop transmission
  This mode is particularly effective for transmissions to RN for which the DeNB 2 fails to obtain channel state information (CSI) about the link between the DeNB 2 and the RN, and for which the precoding method described above therefore becomes impossible. In this case, the precoding information may indicate what type of open loop transmission scheme shall be used. One example of an open loop transmission scheme is a transmit diversity scheme as specified in the LTE Release 8 standards.

Provided that the link between the DeNB 2 and the RN is stable, the DeNB 2 shall signal the precoding information described above to the RN via RRC signaling. For example, the time period between RRC signaling updates is tens of millisecond or above. The RRC signaling is conveyed in the physical layer (PHY) via PDSCH, which supports HARQ mechanism to ensure robustness.

The availability of RRC signaling depends on whether the RN is in active mode or idle mode. When RN moves to an active mode from an idle mode (in which idle mode, RRC signaling is not available to a RN, and it is thus not possible for the RN to receive precoding information via RRC signaling), the RN should first use the non-precoded CRS mentioned above (and labeled as R0 to R3) in FIG. 5 for decoding R-PDCCH.

Thereafter, whilst the RN is active, the RN provides regular updates of the measured CSI to the DeNB 2, and the DeNB 2 then indicates the precoding information via RRC signaling. Whilst the RN is in an active mode, providing updated precoding information to the RN may only be necessary when there is a significant change in the state of the link between the DeNB 2 and the RN. The DeNB 2 can vary the periodicity of providing precoding information via RRC signaling according to the level of variation of coherence time for the link between the DeNB 2 and the RN.

Figure 6:
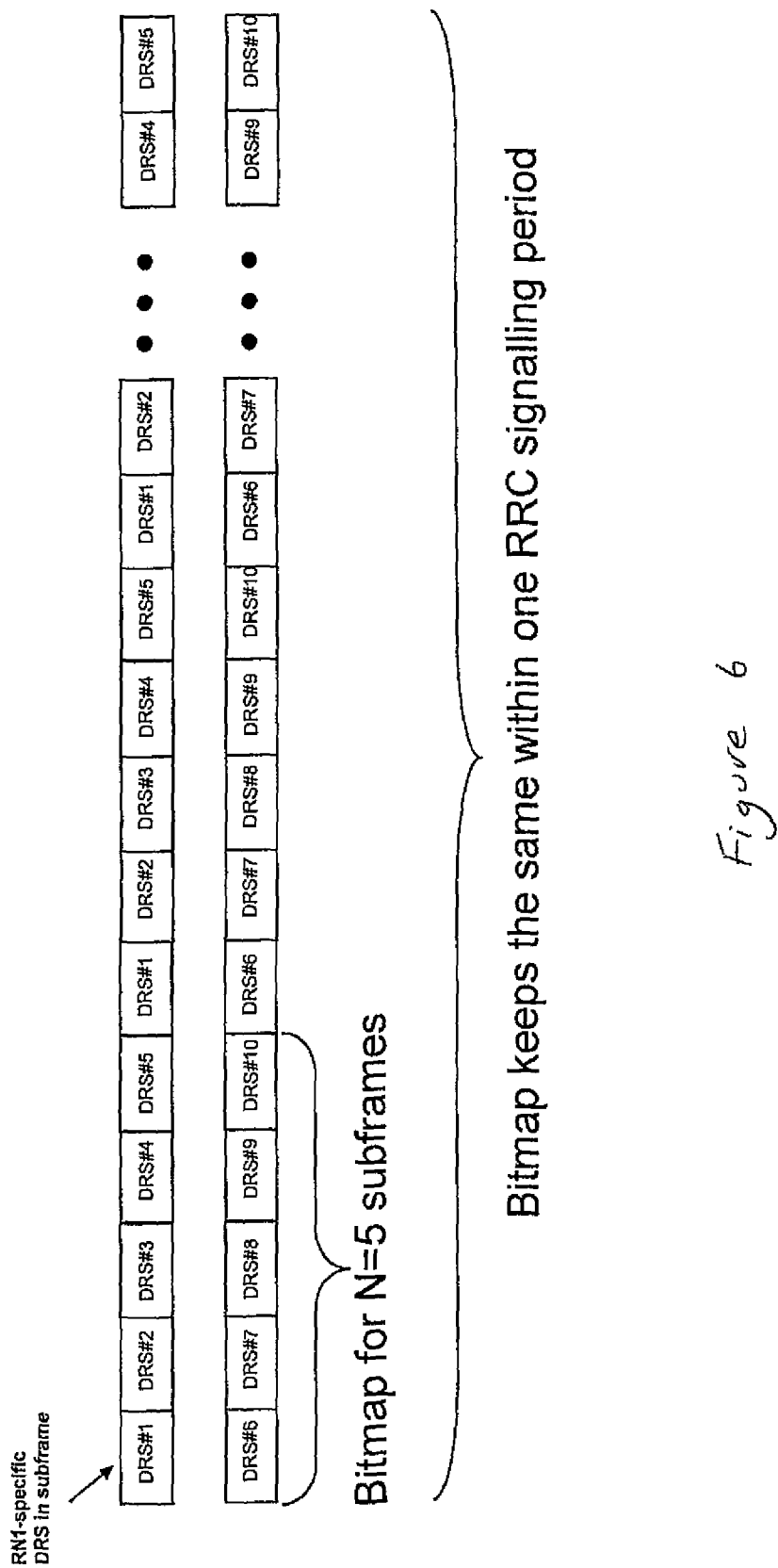
FIG. 6 illustrates an example of scheduling the transmission of reference signals to a plurality of relay nodes receiving transmissions from a common eNB.

As mentioned above, one technique for reducing DRS overhead involves inserting DRS for a RN in only a subset of all DL backhaul subframes contained in each RRC signaling period. FIG. 6 illustrates the use of a bitmap in higher layer signalling to indicate from the DeNB 2 to a RN which sub-frames within the RRC signalling period carry the precoded DRS for that RN. The RN estimates the channel matrix based on the precoded DRS in the sub-frames identified for that RN, uses the estimation for the sub-frame for which the DRS were received, and also reuses the same estimation for all subsequent subframes until the next subframe for which the RN receives new DRS. The bitmap indicates when the precoded DRS for R-PDCCH and R-PDSCH are available within a subset of N subframes. A respective set of DRS is not necessarily provided for every sub-frame for which R-PDCCH and/or R-PDSCH are transmitted, but at least one set of DRS are provided to the RN within the coherence time. For example, precoded DRS for RN1 may be transmitted in subframe #1 (indicated as bitmap 10000), DRS for RN2 may be transmitted in subframe #2 (indicated as bitmap 01000), and so on. The user equipments served directly by the DeNB 2 are not included in the bitmap as they use the CRS mentioned earlier. In the example shown in FIG. 6, RN-specific precoding based on PMI is changed by the DeNB 2 every N=5 subframes.

One option is to transmit within the 5-subframe interval precoded DRS for all the RNs served by the DeNB 2 based on the bitmap, including RNs that may not be scheduled for R-PDCCH and/or R-PDSCH transmissions within the 5-sub-frame interval; then any PRBs in a predefined subset of PRBs may be scheduled both for R-PDCCH (within RN-specific search space) and/or R-PDSCH.

Another option is to signal the bitmap for a subset of PRBs as also indicated by RRC signalling, which is considered to be particularly useful where the DeNB 2 serves a relatively large number of RNs, e.g. more than 5 RNs. The selection of which RNs to include in such a bitmap can be carried out on the basis of the amount of traffic or some other measurable parameter, and the selection is carried out for each RRC signalling period.

An alternative way for reducing RS overhead and making more resources available for physical channel (data/control) transmissions is to use RRC signaling to configure a DRS updating period for the RN, and to provide DRS in only a single subframe, e.g. the first subframe, within the updating period.

These techniques for reducing the number of sub-frames containing DRS for an RN within an RRC signalling period, are particularly useful where (a) the DeNB 2 serves a plurality of RNs requiring DRSs, and/or (b) there are one or more RNs for which the link with the DeNB 2 is subject to relatively flat fading in the frequency domain.

If the RN is a fixed node, then as discussed above, it may be sufficient to transmit the DRS for the RN only in a subset of the subframes within the RRC signalling period. Some examples of rules by which to select subsets are discussed below.

The RN and DeNB 2 have a common understanding as to which subframes include DRS and which subframes are sent without any DRS. If the RN were to mistakenly treat physical channel data as DRS, this could cause a bad channel estimation; on the other hand, if the RN were to mistakenly treat DRS as physical channel data, this could badly degrade the data decoding performance.

One rule is to transmit the DRS in every k-th one of those subframes that are used for transmissions between the DeNB 2 and RN (i.e. not including sub-frames that are used for transmissions from the DeNB 2 directly to one or more user equipments). In view of the fact that the channel estimation for a RN may suffer if that RN does not get traffic for a significant period of time, a further rule specifies that the initial transmission from the DeNB 2 to such RN after such a silent period is done on a subframe for which a specific DRS is provided, not on a subframe for which no specific DRS is provided. The DeNB 2 is thus required to delay such a transmission to such RN until the next sub-frame for which the RN has received a specific DRS, i.e. the next k-th sub-frame.

In order to avoid such a delay, one option is to also additionally and especially include DRS in the first sub-frame after such a silence period. There is a concern that the RN might miss this first sub-frame after the silence period, but receive a subsequent sub-frame and mistakenly assume it to be the first one after the silence period and mistakenly assume that DRS are available in said subsequent sub-frame. This kind of error can be avoided by providing in the R-PDCCH explicit information that indicates whether DRS are present. Alternatively, the RN can detect from the sequence number that there is a gap in the received sub-frames and thereby conclude that the RN has missed the sub-frame in which the DRS were included.

Even then, the failure to receive the first sub-frame actually including the DRS for the RN could lead to a reduction in the performance of decoding the R-PDCCH and/or P-PDSCH in the first sub-frame that is actually received (i.e. the subsequent one after the missed sub-frame including the DRS). One technique aimed at avoiding this is for the DeNB 2 to include DRS in each sub-frame until an acknowledgement from the RN of receipt of a sub-frame including the DRS is received by the DeNB 2.

Another technique involves staggering the time at which DRS are sent for different RNs. For example, a first RN1 would get DRS on subframe numbers ns that fulfill the equation ns mod k=k1, and a second RN2 would get DRS on subframes that fulfill the equation ns mod k=k2.

However, for the case of multi-user MIMO (MU-MIMO) transmissions, i.e. MIMO transmissions to a plurality of RNs within a single PRB, DRS need to be present for either all of said plurality of RNs or none of said plurality of RNs. This requirement can be achieved by specifying an additional rule to the effect that rules for individual RN are superseded by MU-MIMO-specific rules for the case of MU-MIMO sub-frames.

More generally, there can be different rules for different PRBs. The result may be that some DRS are included in some PRBs in accordance with one or more rules, whereas some PRBs may not include any DRS in accordance with one or more other rules.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

What is claimed is:

1. A method for operating a base station comprising:
   transmitting physical reference signals precoded at a physical layer, and
   transmitting via a physical channel semi-static decoding information for use in physical layer decoding of said physical reference signals;
   wherein said decoding information is incorporated into one or more data units at a layer higher than the physical layer;
   wherein one or more physical reference signals are transmitted in a single sub-frame for use in physical layer decoding of a physical channel in a plurality of sub-frames, and
   wherein the decoding information uses a bitmap to indicate an identity of a sub-frame in which said one or more physical reference signals can be found.

2. The method according to claim 1, further comprising sending the indication of the identity of the sub-frame in which said one or more physical reference signals can be found.

3. A base station comprising:
   at least one processor; and
   a transmitter, coupled to the processor configured to transmit physical reference signals at a physical layer;
   transmit via a physical channel semi static decoding information for use in physical layer decoding of said physical reference signals,
   wherein said decoding information is incorporated into one or more data units at a layer higher than the physical layer, wherein one or more physical reference signals are transmitted in a single sub-frame for use in physical layer decoding of a physical channel in a plurality of sub-frames, and wherein the decoding information uses a bitmap to indicate an identity of a sub-frame in which said one or more physical reference signals can be found.

4. A base station comprising:
   a processor and memory including computer program code, wherein the memory and the computer program are configured to, with the processor, cause the apparatus at least to
   transmit physical reference signals preceded at a physical layer, and transmit via a physical channel decoding information for use in physical layer decoding of said physical signals, wherein said decoding information is incorporated into one or more data units at a layer higher than the physical layer, and wherein one or more physical reference signals are transmitted in a single sub-frame for use in physical layer decoding of a physical channel in a plurality of sub-frames, and wherein the decoding information uses a bitmap to indicate an identity of a sub-frame in which said one or more physical reference signals can be found.

5. A method for operating a user equipment comprising:
   configuring a physical layer to decode reference signals precoded at a physical layer using semi-static decoding information received via a physical channel precoded at the physical layer to decode said reference signals at the physical layer, wherein said decoding information is extracted from one or more data units at a layer higher than the physical layer; and
   receiving physical reference signals precoded at the physical layer, wherein one or more physical reference signals are received in a single sub-frame for use in physical layer decoding of a physical channel in a plurality of sub-frames, and wherein the decoding information uses a bitmap to indicate an identity of a sub-frame in which said one or more physical reference signals can be found.

6. The method according to claim 5, further comprising receiving an indication of the identity of the sub-frame in which said one or more physical reference signals are located.

7. A user equipment comprising:
   a processor configured to decode reference signals precoded at a physical layer use semi-static decoding information received via a physical channel precoded at the physical layer to decode said reference signals at the physical layer, wherein said decoding information is extracted from one or more data units at a layer higher than the physical layer; and
   a receiver coupled to the processor and configured to receive physical reference signals precoded at the physical layer, wherein one or more physical reference signals are received in a single sub-frame for use in physical layer decoding of a physical channel in a plurality of sub-frames, and wherein the decoding information uses a bitmap to indicate an identity of a sub-frame in which said one or more physical reference signals can be found.

8. A user equipment comprising:
   a processor and memory including computer program code, wherein the memory and the computer program are configured to, with the processor, cause the apparatus at least to configure a physical layer to decode reference signals precoded at a physical layer; use semi-static decoding information received via a physical channel precoded at the physical layer to decode said reference signals at the physical layer, wherein said decoding information is extracted from one or more data units at a layer higher than the physical layer; and receive physical reference signals precoded at the physical layer, wherein one or more physical reference signals are received in a single sub-frame for use in physical layer decoding of a physical channel in a plurality of sub-frames, and wherein the decoding information uses a bitmap to indicate an identity of a sub-frame in which said one or more physical reference signals can be found.

9. A system comprising:
   a transmitter configured to transmit physical reference signals precoded at a physical layer, and transmit via a physical channel semi-static decoding information for use in physical layer decoding of said physical signals, wherein said decoding information is incorporated into one or more data units at a layer higher than the physical layer, wherein one or more physical reference signals are transmitted in a single sub-frame for use in physical layer decoding of a physical channel in a plurality of subframes; and
   a receiver configured to configure a physical layer to decode reference signals precoded at a physical layer; and use said semi-static decoding information to decode said reference signals at the physical layer, and receive physical reference signals precoded at the physical layer, wherein one or more physical reference signals are received in a single sub-frame for use in physical layer decoding of a physical channel in a plurality of sub-frames, and wherein the decoding information uses a bitmap to indicate an identity of a sub-frame in which said one or more physical reference signals can be found.

10. The method according to claim 1, wherein the decoding information includes information for physical layer decoding of a multi-antenna transmission.

11. The method according to claim 1, wherein said layer higher than the physical layer is a radio resource control layer.

12. The method according to claim 1, where the physical channel includes data for relaying to a user equipment via a wireless interface.

13. The base station according to claim 3, wherein the decoding information includes information for physical layer decoding of a multi-antenna transmission.

14. The base station according to claim 3, wherein said layer higher than the physical layer is a radio resource control layer.

15. The base station according to claim 3, where the physical channel includes data for relaying to a user equipment via a wireless interface.

16. The system according to claim 9, wherein the decoding information includes information for physical layer decoding of a multi-antenna transmission.

17. The system according to claim 9, wherein said layer higher than the physical layer is a radio resource control layer.

18. The system according to claim 9, where the physical channel includes data for relaying to a user equipment via a wireless interface.

19. A non-transitory computer program product comprising program code means which when loaded into a computer controls the computer to perform the method according to claim 1.

\* \* \* \* \*